United States Patent
Tapia et al.

(10) Patent No.: US 12,482,257 B2
(45) Date of Patent: Nov. 25, 2025

(54) REDUCING ENVIRONMENTAL INTERFERENCE FROM IMAGES

(71) Applicant: GM Cruise Holdings LLC, San Francisco, CA (US)

(72) Inventors: Daniel Flores Tapia, Fairfield, CA (US); Jace Artichoker, San Francisco, CA (US)

(73) Assignee: GM CRUISE HOLDINGS LLC, San Francisco, CA (US)

( * ) Notice: Subject to any disclaimer, the term of this patent is extended or adjusted under 35 U.S.C. 154(b) by 449 days.

(21) Appl. No.: 17/884,747

(22) Filed: Aug. 10, 2022

(65) Prior Publication Data

US 2024/0054777 A1 Feb. 15, 2024

(51) Int. Cl.
*G06V 10/98* (2022.01)
*G06T 5/10* (2006.01)
(Continued)

(52) U.S. Cl.
CPC .............. *G06V 10/993* (2022.01); *G06T 5/10* (2013.01); *G06T 5/70* (2024.01); *G06V 10/82* (2022.01);
(Continued)

(58) Field of Classification Search
CPC ........... G06T 2207/20081; G06T 11/00; G06T 17/00; G06T 2207/20064; G06T 5/70; G06T 5/73; G06T 2207/30168; G06T 5/00; G06T 2207/30192; G06T 2207/30252; G06V 10/82; G06V 10/764; G06V 10/40; G06V 40/172; G06V 10/30; G06V 10/25; G06V 10/60; G06V 20/56; G06F 30/27; B60W 30/0956; B60W 40/02; B60W 60/0011; B60W 60/001; B60W 2420/403;
(Continued)

(56) References Cited

U.S. PATENT DOCUMENTS

| | | | |
|---|---|---|---|
| 2022/0041185 A1* | 2/2022 | Radha | G06F 18/214 |
| 2022/0188554 A1* | 6/2022 | Huang | G01S 13/931 |
| 2023/0060736 A1* | 3/2023 | Hsu | G06T 5/77 |

OTHER PUBLICATIONS

Fu, Xueyang, et al. "Removing rain from single images via a deep detail network." Proceedings of the IEEE conference on computer vision and pattern recognition. 2017. (Year: 2017).*

(Continued)

*Primary Examiner* — Sumati Lefkowitz
*Assistant Examiner* — Connor L Hansen
(74) *Attorney, Agent, or Firm* — CANTOR COLBURN LLP (57) ABSTRACT

The present technology determines noise in an image of a representation of an environment around an autonomous vehicle (AV). A sensor system receives a first image that represents an environment around the AV including at least one object that may be obscured by environmental conditions. The first image is analyzed to determine if pixels in the first image represent noise from the environmental conditions in comparison to other pixels in the first image that represents a higher degree of image detail. A second image can be generated using the pixels in the first image that represent the higher degree of image detail to result in an output that is less affected by noise from environmental conditions and may result in better performance by downstream systems relying of date from the sensor system.

17 Claims, 5 Drawing Sheets

(51) Int. Cl.
  *G06T 5/70* (2024.01)
  *G06V 10/82* (2022.01)
  *G06V 20/56* (2022.01)

(52) U.S. Cl.
  CPC .... *G06V 20/56* (2022.01); *G06T 2207/20064* (2013.01); *G06T 2207/20081* (2013.01); *G06T 2207/20084* (2013.01); *G06T 2207/30168* (2013.01); *G06T 2207/30192* (2013.01); *G06T 2207/30252* (2013.01)

(58) Field of Classification Search
  CPC . G01S 2013/9318; G01S 13/865; G01S 17/86
  See application file for complete search history.

(56) References Cited

OTHER PUBLICATIONS

Ravisankar, Priyadharsini. "Underwater acoustic image denoising using stationary wavelet transform and various shrinkage functions." ELCVIA: Electronic Letters on Computer Vision and Image Analysis 20.2 (2021): 0038-50. (Year: 2021).*

Fazeli, Reza "Generating High-Resolution Images Using Deep Autoregressive Models" Medium, 2019 (Year: 2019).*

* cited by examiner

REDUCING ENVIRONMENTAL INTERFERENCE FROM IMAGES

TECHNICAL FIELD

The present disclosure generally pertains to the analysis of image data of sensors that are used by vehicles to determine environmental interference. More specifically, the present technology pertains to the use of one or more cameras of a vehicle in an analysis of the environment surrounding the vehicle, to identify environmental interference that might affect data captured by the cameras and to adjust the processing of the data from the cameras to reduce incorrect interpretations of the data from the camera resulting from the environmental interference.

BACKGROUND

An autonomous vehicle is a motorized vehicle that can navigate without a human driver. An exemplary autonomous vehicle can include various sensors, such as a camera sensor, a light detection and ranging (LIDAR) sensor, and a radio detection and ranging (RADAR) sensor, amongst others. The sensors collect data and measurements that the autonomous vehicle can use for operations such as navigation. The sensors can provide the data and measurements to an internal computing system of the autonomous vehicle, which can use the data and measurements to control a mechanical system of the autonomous vehicle, such as a vehicle propulsion system, a braking system, or a steering system. Similar sensors may also be mounted onto non-autonomous vehicles, for example onto vehicles whose sensor data is used to determine interference from images captured by the sensors of the environment surrounding the vehicle.

BRIEF DESCRIPTION OF THE DRAWINGS

Details of one or more aspects of the subject matter described in this disclosure are set forth in the accompanying drawings and the description below. However, the accompanying drawings illustrate only some typical aspects of this disclosure and are therefore not to be considered limiting of its scope. Other features, aspects, and advantages will become apparent from the description, the drawings and the claims.

DETAILED DESCRIPTION

The detailed description set forth below is intended as a description of various configurations of the subject technology and is not intended to represent the only configurations in which the subject technology can be practiced. The appended drawings are incorporated herein and constitute a part of the detailed description. The detailed description includes specific details for the purpose of providing a more thorough understanding of the subject technology. However, it will be clear and apparent that the subject technology is not limited to the specific details set forth herein and may be practiced without these details. In some instances, structures and components are shown in block diagram form in order to avoid obscuring the concepts of the subject technology.

Many sensors can be affected by the weather. For example, a LIDAR sensor might not be able to receive reflections of light from a great of a range in rain or fog as in clear conditions. A visual camera may be portions of an image distorted by rain or snow on the lens of the camera. Even RADAR might not have the same range or quality of radio returns in some weather conditions.

Many of these types of sensors and others are often found on autonomous vehicles. Just as a human driver might find it harder to see during rain or fog, or might find it more difficult to hear during a heavy downpour of rain, the sensors of an autonomous vehicle also might not perform as well during some conditions.

The type of weather is not the only factor. The severity of the weather is also relevant. Visibility during a drizzle or sun shower is often better than in a downpour at night.

While some autonomous vehicles might be configured with driving modes for particular types of weather, this is a poorly fitted solution to the problem. Often these models can rely on weather forecasts or sensors to inform the autonomous vehicle that it is raining or snowing, and these models can cause the autonomous vehicle to drive more cautiously. However, these models do not take into account the severity of the weather, and/or might have a hard time discerning between different types of precipitation.

Furthermore, while an autonomous vehicle might be configured to drive more cautiously, this does nothing to help the autonomous vehicle interpret the data it is receiving from its sensors. The sensors are still functioning, but the quality of their data is obscured by noise caused by environmental conditions.

The present technology is directed toward analyzing sensor data and determining what aspects of the sensor data are distorted due to environmental interference and utilizing the data to create a version of the sensor data that is made up from portions of the sensor data that are less impacted by the environmental interference. While this data might be at a lower resolution, the data is more reliable. Thus, the autonomous vehicle receives more reliable data upon which to interpret the environment surrounding it.

Not only does the present technology result in more reliable data coming from sensors, but the present technology also can integrate this data into the perception models generally used by the autonomous vehicle. This is more desirable than utilizing a separate perception model for occurrences of weather because the model that is generally used is better trained to recognize objects. It is better trained because the dataset across all driving conditions is necessarily greater than the dataset for recognizing objects during times of precipitation. Also, if the perception model was trained to recognize objects during weather events, the model would have relatively few instances for each type of weather event at each type of severity at each set of lighting conditions. There is infinite variation in the precise attributes of any given weather event, and since it is impractical to train a perception model with enough example of the full spectrum of weather events, severities, and lighting, such a model will always be limited. Thus a benefit of the present technology is that it does not rely upon a separate perception model.

The present technology can also be directed to differentiating between types of weather and the severity of weather which can further be useful to the autonomous vehicle in planning actions to pilot the autonomous vehicle.

The disclosed technologies address a need in the art for improvements to the analysis of images captured by vehicle optical devices. The use of vehicle optical devices improves the processing capabilities of an autonomous vehicle of the surrounding area and environment in order to determine actions or adjustments during navigation of a route. The use of the optical devices ultimately allows systems of the autonomous vehicle (AV) to process the image data received, reduce the interference caused by the environment surrounding the vehicle, and characterize the environment perceived surrounding the AV. The environment perceived allows an autonomous vehicle to integrate safety measures related to the atmospheric and weather conditions when navigating a route, and determining passenger safety.

Figure 1:
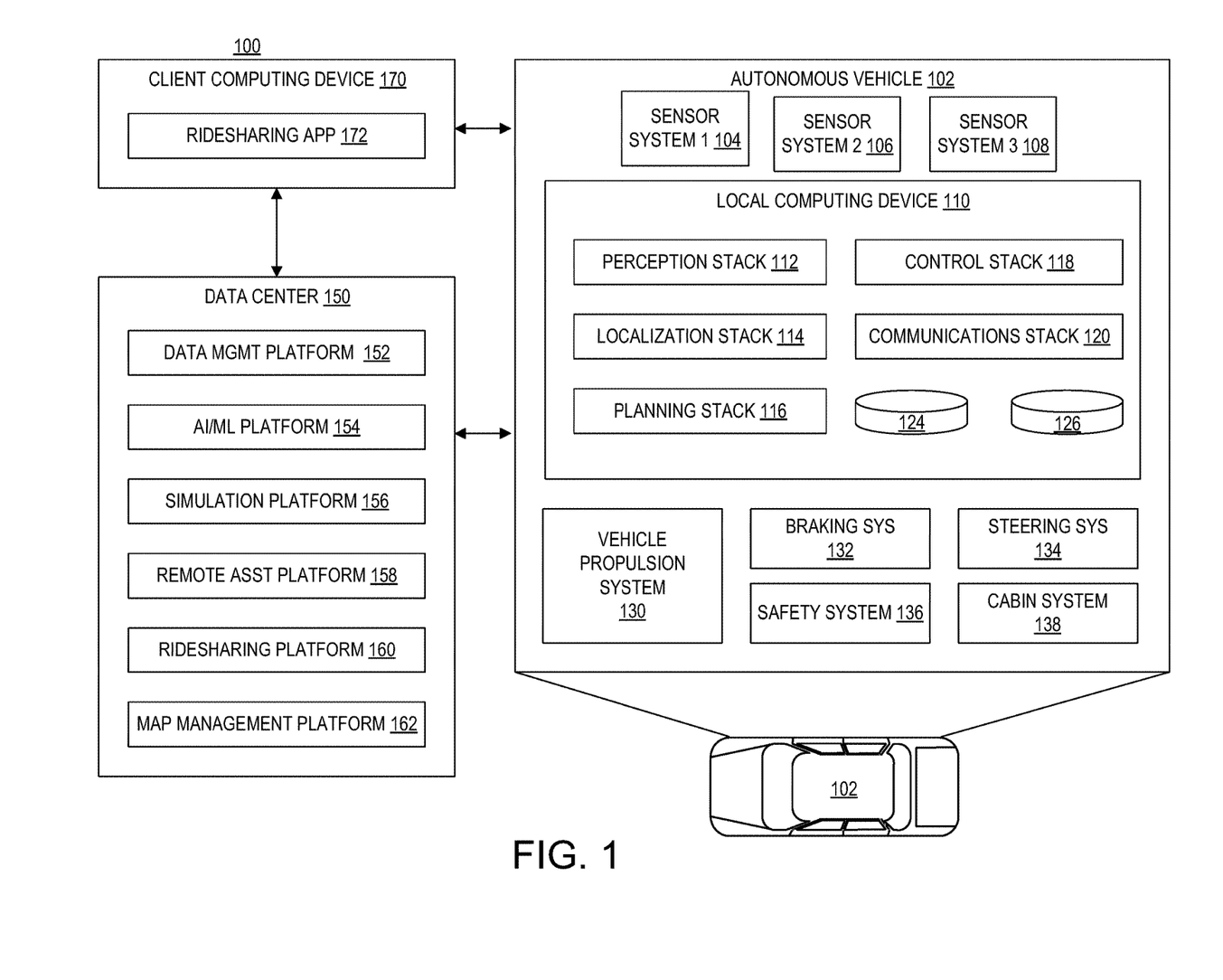
FIG. 1 illustrates an example system environment that can be used to facilitate autonomous vehicle (AV) dispatch and operations, according to some aspects of the disclosed technology.

FIG. 1 illustrates an autonomous vehicle and remote computing system architecture.

Turning now to FIG. 1, this figure illustrates an example of an AV management system 100. One of ordinary skill in the art will understand that, for the AV management system 100 and any system discussed in the present disclosure, there can be additional or fewer components in similar or alternative configurations. The illustrations and examples provided in the present disclosure are for conciseness and clarity. Other embodiments may include different numbers and/or types of elements, but one of ordinary skill the art will appreciate that such variations do not depart from the scope of the present disclosure.

In this example, the AV management system 100 includes an AV 102, a data center 150, and a client computing device 170. The AV 102, the data center 150, and the client computing device 170 can communicate with one another over one or more networks (not shown), such as a public network (e.g., the Internet, an Infrastructure as a Service (IaaS) network, a Platform as a Service (PaaS) network, a Software as a Service (SaaS) network, another Cloud Service Provider (CSP) network, etc.), a private network (e.g., a Local Area Network (LAN), a private cloud, a Virtual Private Network (VPN), etc.), and/or a hybrid network (e.g., a multi-cloud or hybrid cloud network, etc.).

AV 102 can navigate about roadways without a human driver based on sensor signals generated by multiple sensor systems 104, 106, and 108. The sensor systems 104-108 can include different types of sensors and can be arranged about the AV 102. For instance, the sensor systems 104-108 can comprise Inertial Measurement Units (IMUs), cameras (e.g., still image cameras, video cameras, etc.), light sensors (e.g., LIDAR systems, ambient light sensors, infrared sensors, etc.), RADAR systems, a Global Navigation Satellite System (GNSS) receiver, (e.g., Global Positioning System (GPS) receivers), audio sensors (e.g., microphones, Sound Navigation and Ranging (SONAR) systems, ultrasonic sensors, etc.), engine sensors, speedometers, tachometers, odometers, altimeters, tilt sensors, impact sensors, airbag sensors, seat occupancy sensors, open/closed door sensors, tire pressure sensors, rain sensors, and so forth. For example, the sensor system 104 can be a camera system, the sensor system 106 can be a LIDAR system, and the sensor system 108 can be a RADAR system. Other embodiments may include any other number and type of sensors.

The AV 102 can also include several mechanical systems that can be used to maneuver or operate AV 102. For instance, the mechanical systems can include vehicle propulsion system 130, braking system 132, steering system 134, safety system 136, and cabin system 138, among other systems. Vehicle propulsion system 130 can include an electric motor, an internal combustion engine, or both. The braking system 132 can include an engine brake, a wheel braking system (e.g., a disc braking system that utilizes brake pads), hydraulics, actuators, and/or any other suitable componentry configured to assist in decelerating AV 102. The steering system 134 can include suitable componentry configured to control the direction of movement of the AV 102 during navigation. Safety system 136 can include lights and signal indicators, a parking brake, airbags, and so forth. The cabin system 138 can include cabin temperature control systems, in-cabin entertainment systems, and so forth. In some embodiments, the AV 102 may not include human driver actuators (e.g., steering wheel, handbrake, foot brake pedal, foot accelerator pedal, turn signal lever, window wipers, etc.) for controlling the AV 102. Instead, the cabin system 138 can include one or more client interfaces (e.g., Graphical User Interfaces (GUIs), Voice User Interfaces (VUIs), etc.) for controlling certain aspects of the mechanical systems 130-138.

The AV 102 can additionally include a local computing device 110 that is in communication with the sensor systems 104-108, the mechanical systems 130-138, the data center 150, and the client computing device 170, among other systems. The local computing device 110 can include one or more processors and memory, including instructions that can be executed by the one or more processors. The instructions can make up one or more software stacks or components responsible for controlling the AV 102; communicating with the data center 150, the client computing device 170, and other systems; receiving inputs from riders, passengers, and other entities within the AV's environment; logging metrics collected by the sensor systems 104-108; and so forth. In this example, the local computing device 110 includes a perception stack 112, a mapping and localization stack 114, a planning stack 116, a control stack 118, a communications stack 120, an High Definition (HD) geospatial database 122, and an AV operational database 124, among other stacks and systems.

Perception stack 112 can enable the AV 102 to "see" (e.g., via cameras, LIDAR sensors, infrared sensors, etc.), "hear" (e.g., via microphones, ultrasonic sensors, RADAR, etc.), and "feel" (e.g., pressure sensors, force sensors, impact sensors, etc.) its environment using information from the sensor systems 104-108, the mapping and localization stack 114, the HD geospatial database 122, other components of the AV, and other data sources (e.g., the data center 150, the client computing device 170, third-party data sources, etc.). The perception stack 112 can detect and classify objects and determine their current and predicted locations, speeds, directions, and the like. In addition, the perception stack 112 can determine the free space around the AV 102 (e.g., to maintain a safe distance from other objects, change lanes, park the AV, etc.). The perception stack 112 can also identify environmental uncertainties, such as where to look for moving objects, flag areas that may be obscured or blocked from view, and so forth.

Mapping and localization stack 114 can determine the AV's position and orientation (pose) using different methods from multiple systems (e.g., GPS, IMUs, cameras, LIDAR, RADAR, ultrasonic sensors, the HD geospatial database 122, etc.). For example, in some embodiments, the AV 102 can compare sensor data captured in real-time by the sensor systems 104-108 to data in the HD geospatial database 122 to determine its precise (e.g., accurate to the order of a few centimeters or less) position and orientation. The AV 102 can focus its search based on sensor data from one or more first sensor systems (e.g., GPS) by matching sensor data from one or more second sensor systems (e.g., LIDAR). If the mapping and localization information from one system is unavailable, the AV 102 can use mapping and localization information from a redundant system and/or from remote data sources.

The planning stack 116 can determine how to maneuver or operate the AV 102 safely and efficiently in its environment. For example, the planning stack 116 can receive the location, speed, and direction of the AV 102, geospatial data, data regarding objects sharing the road with the AV 102 (e.g., pedestrians, bicycles, vehicles, ambulances, buses, cable cars, trains, traffic lights, lanes, road markings, etc.) or certain events occurring during a trip (e.g., an Emergency Vehicle (EMV) blaring a siren, intersections, occluded areas, street closures for construction or street repairs, Double-Parked Vehicles (DPVs), etc.), traffic rules and other safety standards or practices for the road, user input, and other relevant data for directing the AV 102 from one point to another. The planning stack 116 can determine multiple sets of one or more mechanical operations that the AV 102 can perform (e.g., go straight at a specified speed or rate of acceleration, including maintaining the same speed or decelerating; turn on the left blinker, decelerate if the AV is above a threshold range for turning, and turn left; turn on the right blinker, accelerate if the AV is stopped or below the threshold range for turning, and turn right; decelerate until completely stopped and reverse; etc.), and select the best one to meet changing road conditions and events. If something unexpected happens, the planning stack 116 can select from multiple backup plans to carry out. For example, while preparing to change lanes to turn right at an intersection, another vehicle may aggressively cut into the destination lane, making the lane change unsafe. The planning stack 116 could have already determined an alternative plan for such an event, and upon its occurrence, help to direct the AV 102 to go around the block instead of blocking a current lane while waiting for an opening to change lanes.

The control stack 118 can manage the operation of the vehicle propulsion system 130, the braking system 132, the steering system 134, the safety system 136, and the cabin system 138. The control stack 118 can receive sensor signals from the sensor systems 104-108 as well as communicate with other stacks or components of the local computing device 110 or a remote system (e.g., the data center 150) to effectuate operation of the AV 102. For example, the control stack 118 can implement the final path or actions from the multiple paths or actions provided by the planning stack 116. This can involve turning the routes and decisions from the planning stack 116 into commands for the actuators that control the AV's steering, throttle, brake, and drive unit.

The communication stack 120 can transmit and receive signals between the various stacks and other components of the AV 102 and between the AV 102, the data center 150, the client computing device 170, and other remote systems. The communication stack 120 can enable the local computing device 110 to exchange information remotely over a network, such as through an antenna array or interface that can provide a metropolitan WIFI® network connection, a mobile or cellular network connection (e.g., Third Generation (3G), Fourth Generation (4G), Long-Term Evolution (LTE), 5th Generation (5G), etc.), and/or other wireless network connection (e.g., License Assisted Access (LAA), Citizens Broadband Radio Service (CBRS), MULTEFIRE, etc.). The communication stack 120 can also facilitate local exchange of information, such as through a wired connection (e.g., a user's mobile computing device docked in an in-car docking station or connected via Universal Serial Bus (USB), etc.) or a local wireless connection (e.g., Wireless Local Area Network (WLAN), Bluetooth®, infrared, etc.).

The HD geospatial database 122 can store HD maps and related data of the streets upon which the AV 102 travels. In some embodiments, the HD maps and related data can comprise multiple layers, such as an areas layer, a lanes and boundaries layer, an intersections layer, a traffic controls layer, and so forth. The areas layer can include geospatial information indicating geographic areas that are drivable (e.g., roads, parking areas, shoulders, etc.) or not drivable (e.g., medians, sidewalks, buildings, etc.), drivable areas that constitute links or connections (e.g., drivable areas that form the same road) versus intersections (e.g., drivable areas where two or more roads intersect), and so on. The lanes and boundaries layer can include geospatial information of road lanes (e.g., lane or road centerline, lane boundaries, type of lane boundaries, etc.) and related attributes (e.g., direction of travel, speed limit, lane type, etc.). The lanes and boundaries layer can also include three-dimensional (3D) attributes related to lanes (e.g., slope, elevation, curvature, etc.). The intersections layer can include geospatial information of intersections (e.g., crosswalks, stop lines, turning lane centerlines, and/or boundaries, etc.) and related attributes (e.g., permissive, protected/permissive, or protected only left turn lanes; permissive, protected/permissive, or protected only U-turn lanes; permissive or protected only right turn lanes; etc.). The traffic controls layer can include geospatial information of traffic signal lights, traffic signs, and other road objects and related attributes.

The AV operational database 124 can store raw AV data generated by the sensor systems 104-108 and other components of the AV 102 and/or data received by the AV 102 from remote systems (e.g., the data center 150, the client computing device 170, etc.). In some embodiments, the raw AV data can include HD LIDAR point cloud data, image or video data, RADAR data, GPS data, and other sensor data that the data center 150 can use for creating or updating AV geospatial data as discussed further below with respect to FIG. 5 and elsewhere in the present disclosure.

The data center 150 can be a private cloud (e.g., an enterprise network, a co-location provider network, etc.), a public cloud (e.g., an IaaS network, a PaaS network, a SaaS network, or other CSP network), a hybrid cloud, a multi-cloud, and so forth. The data center 150 can include one or more computing devices remote to the local computing device 110 for managing a fleet of AVs and AV-related services. For example, in addition to managing the AV 102, the data center 150 may also support a ridesharing service, a delivery service, a remote/roadside assistance service, street services (e.g., street mapping, street patrol, street cleaning, street metering, parking reservation, etc.), and the like.

The data center 150 can send and receive various signals to and from the AV 102 and the client computing device 170. These signals can include sensor data captured by the sensor systems 104-108, roadside assistance requests, software updates, ridesharing pick-up and drop-off instructions, and so forth. In this example, the data center 150 includes one or more of a data management platform 152, an Artificial Intelligence/Machine Learning (AI/ML) platform 154, a simulation platform 156, a remote assistance platform 158, a ridesharing platform 160, and a map management platform 162, among other systems.

Data management platform 152 can be a "big data" system capable of receiving and transmitting data at high speeds (e.g., near real-time or real-time), processing a large variety of data, and storing large volumes of data (e.g., terabytes, petabytes, or more of data). The varieties of data can include data having different structures (e.g., structured, semi-structured, unstructured, etc.), data of different types (e.g., sensor data, mechanical system data, ridesharing service data, map data, audio data, video data, etc.), data associated with different types of data stores (e.g., relational databases, key-value stores, document databases, graph databases, column-family databases, data analytic stores, search engine databases, time series databases, object stores, file systems, etc.), data originating from different sources (e.g., AVs, enterprise systems, social networks, etc.), data having different rates of change (e.g., batch, streaming, etc.), or data having other heterogeneous characteristics. The various platforms and systems of the data center 150 can access data stored by the data management platform 152 to provide their respective services.

The AI/ML platform 154 can provide the infrastructure for training and evaluating machine learning algorithms for operating the AV 102, the simulation platform 156, the remote assistance platform 158, the ridesharing platform 160, the map management platform 162, and other platforms and systems. Using the AI/ML platform 154, data scientists can prepare data sets from the data management platform 152; select, design, and train machine learning models; evaluate, refine, and deploy the models; maintain, monitor, and retrain the models; and so on.

The simulation platform 156 can enable testing and validation of the algorithms, machine learning models, neural networks, and other development efforts for the AV 102, the remote assistance platform 158, the ridesharing platform 160, the map management platform 162, and other platforms and systems. The simulation platform 156 can replicate a variety of driving environments and/or reproduce real-world scenarios from data captured by the AV 102, including rendering geospatial information and road infrastructure (e.g., streets, lanes, crosswalks, traffic lights, stop signs, etc.) obtained from the map management platform 162; modeling the behavior of other vehicles, bicycles, pedestrians, and other dynamic elements; simulating inclement weather conditions, different traffic scenarios; and so on.

The remote assistance platform 158 can generate and transmit instructions regarding the operation of the AV 102. For example, in response to an output of the AI/ML platform 154 or other system of the data center 150, the remote assistance platform 158 can prepare instructions for one or more stacks or other components of the AV 102.

The ridesharing platform 160 can interact with a customer of a ridesharing service via a ridesharing application 172 executing on the client computing device 170. The client computing device 170 can be any type of computing system, including a server, desktop computer, laptop, tablet, smartphone, smart wearable device (e.g., smart watch; smart eyeglasses or other Head-Mounted Display (HMD); smart ear pods or other smart in-ear, on-ear, or over-ear device; etc.), gaming system, or other general purpose computing device for accessing the ridesharing application 172. The client computing device 170 can be a customer's mobile computing device or a computing device integrated with the AV 102 (e.g., the local computing device 110). The ridesharing platform 160 can receive requests to be picked up or dropped off from the ridesharing application 172 and dispatch the AV 102 for the trip.

Map management platform 162 can provide a set of tools for the manipulation and management of geographic and spatial (geospatial) and related attribute data. The data management platform 152 can receive LIDAR point cloud data, image data (e.g., still image, video, etc.), RADAR data, GPS data, and other sensor data (e.g., raw data) from one or more AVs 102, Unmanned Aerial Vehicles (UAVs), satellites, third-party mapping services, and other sources of geospatially referenced data. The raw data can be processed, and map management platform 162 can render base representations (e.g., tiles (2D), bounding volumes (3D), etc.) of the AV geospatial data to enable users to view, query, label, edit, and otherwise interact with the data. Map management platform 162 can manage workflows and tasks for operating on the AV geospatial data. Map management platform 162 can control access to the AV geospatial data, including granting or limiting access to the AV geospatial data based on user-based, role-based, group-based, task-based, and other attribute-based access control mechanisms. Map management platform 162 can provide version control for the AV geospatial data, such as to track specific changes that (human or machine) map editors have made to the data and to revert changes when necessary. Map management platform 162 can administer release management of the AV geospatial data, including distributing suitable iterations of the data to different users, computing devices, AVs, and other consumers of HD maps. Map management platform 162 can provide analytics regarding the AV geospatial data and related data, such as to generate insights relating to the throughput and quality of mapping tasks.

In some embodiments, the map viewing services of map management platform 162 can be modularized and deployed as part of one or more of the platforms and systems of the data center 150. For example, the AI/ML platform 154 may incorporate the map viewing services for visualizing the effectiveness of various object detection or object classification models, the simulation platform 156 may incorporate the map viewing services for recreating and visualizing certain driving scenarios, the remote assistance platform 158 may incorporate the map viewing services for replaying traffic incidents to facilitate and coordinate aid, the ridesharing platform 160 may incorporate the map viewing services into the ridesharing application 172 to enable passengers to view the AV 102 in transit en route to a pick-up or drop-off location, and so on.

Figure 2:
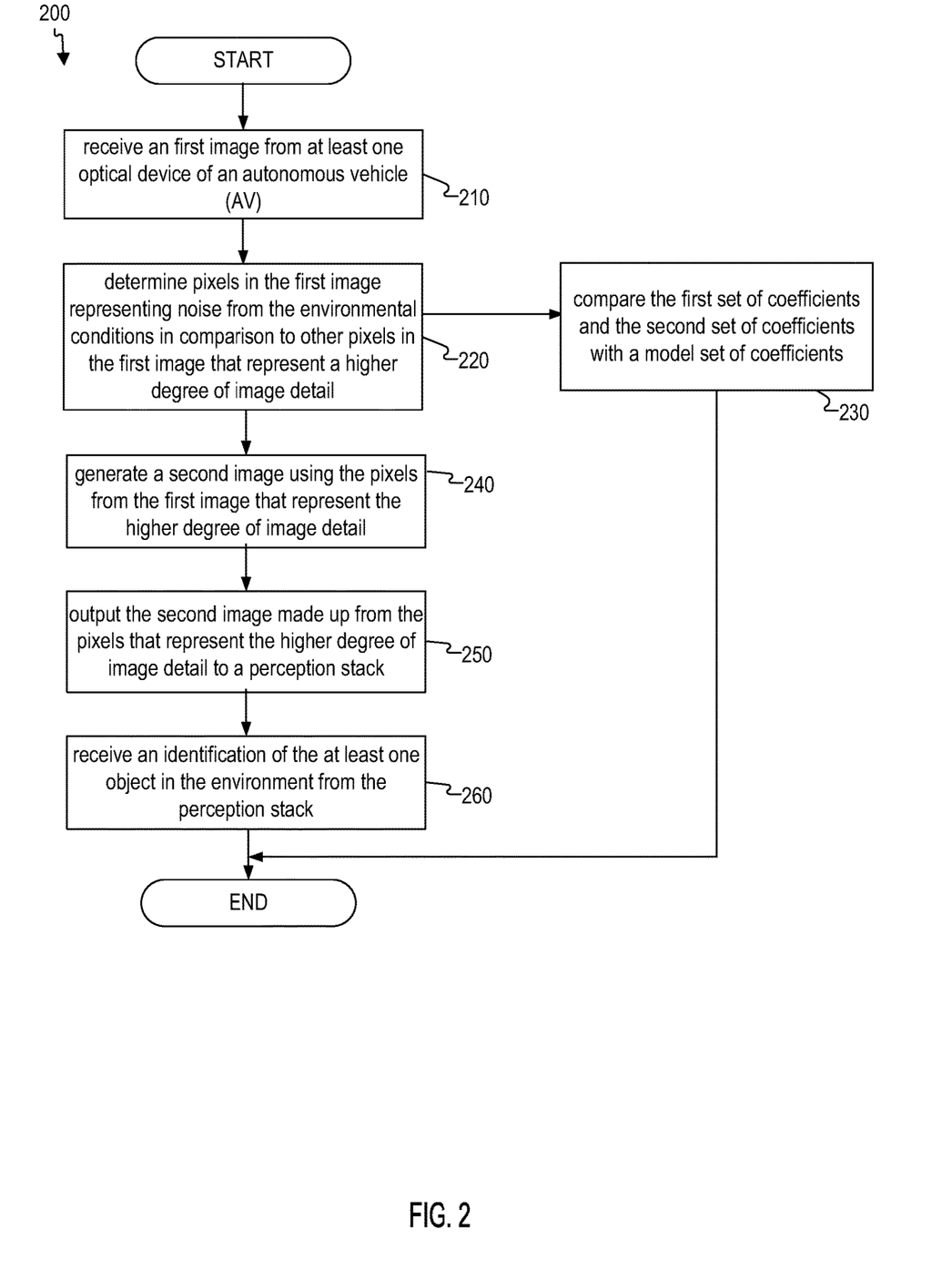
FIG. 2 illustrates a flow diagram illustrating an example method for determining noise in an image of a representation of an environment around an autonomous vehicle (AV), according to some aspects of the disclosed technology.

FIG. 2 illustrates an example method 200 for determining noise in an image of an environment around an autonomous vehicle (AV). Although the example method 200 depicts a particular sequence of operations, the sequence may be altered without departing from the scope of the present disclosure. For example, some of the operations depicted may be performed in parallel or in a different sequence that does not materially affect the function of the method 200. In other examples, different components of an example device or system that implements the method 200 may perform functions at substantially the same time or in a specific sequence.

According to some examples, the method includes receiving a first image from at least one optical device of an autonomous vehicle (AV) at block 210. For example, one of the sensor systems 104-106 illustrated in FIG. 1 may receive the first image from at least one optical device of an autonomous vehicle (AV). The image data represents an environment around the AV including at least one object. In some embodiments, the visibility of at least one object is impaired by various environmental conditions.

In some embodiments, the processing of the image captured by the one of the sensor systems 104-106 as addressed herein, can be performed by the sensor itself. The necessary software may be part of the sensor firmware. In some embodiments, the processing of the image captured by the one of the sensor systems 104-106 as addressed herein, can be performed by additional software and hardware provided by the local computing device 110. As used herein, the term sensor system includes all necessary components to capture the image and process the image prior to providing the processed image to one or more of the driving stacks of the autonomous vehicle, such as, for example, the perception stack 112. Therefore, reference to the sensor system can mean hardware and software for the sensor itself, or also including software and processing capabilities provided by the local computing device 110.

Accordingly, in some examples, the method includes determining pixels in the first image representing noise from the environmental conditions in comparison to other pixels in the first image that represents a higher degree of image detail at block 220. For example, the data management platform 152 in the data center 150 illustrated in FIG. 1 may determine pixels in the first image representing noise from the environmental conditions in comparison to other pixels in the first image that represent a higher degree of image detail. Noise in an image can be indicative of the severity of weather or the type of weather the AV is experiencing.

The noise in the image can be determined by performing a static wavelet transform (SWT) decomposition. For example, one of the sensor systems 104-106 illustrated in FIG. 1 may perform a static wavelet transform (SWT) decomposition. The SWT decomposition comprises generating an output correlation between a wavelet and one or more pixels of the image. The SWT decomposition generates a first set of coefficients for pixels in the image to determine the shape of at least one object in the image and a second set of coefficients to determine noise in the image. The SWT decomposition can be applied by working across rows and columns of the image.

In some examples, the performance of the SWT for each image in the image stream allows one of the sensor systems 104-106 to separate the presence of noise within the image that may be caused by the effects of weather, from an object that is present in the image as captured by the one of the sensor systems 104-106. Furthermore, in addition to the presence of noise that may be caused by the effects of weather, there may be instances of which the noise within one more pixels of the image may be representative of degradation of one of the sensor systems 104-106.

In some examples, the SWT is calculated to evaluate the nature of the variation in the pixels and to identify the main single components that represent the details from the environment captured in the image. This is done to better separate the desired details in the image versus the weather effects on the image due to the presence of the noise that is represented in the image. For example, if the image components are based on thermal noise from a signal processing from the image, the magnitude of signal components will decrease as a function of scale. If the magnitude of the signal components are caused by weather effects the magnitude will not decrease, and instead will likely increase as a function of scale.

Further, the method comprises determining based on a comparison of the first set of coefficients and the second set of coefficients if pixels in the image represent noise of the image in comparison to other pixels in the image at block 220. For example, one of the sensor systems 104-106 illustrated in FIG. 1 may determine based on a comparison of the first set of coefficients and the second set of coefficients if pixels in the image represent noise of the image in comparison to other pixels in the image. The SWT coefficients measure how closely correlated the wavelet is with pixels in each section of the image. For example, if the coefficient closely resembles a high level of detail of an object, in the comparison, the associated pixels are determined as a pixel without (or with less influence from) noise. If the coefficient does not resemble a higher level of detail of the object, the pixels are determined as noise. The higher level of details of the object can be determined based on a noise threshold. The noise threshold can be detected by running a statistical analysis on diagonal SWT coefficients. Based on the threshold that is determined from the diagonal SWT coefficients, the associated pixels are able to be identified as noise, or considered to be details of the object itself. For example, if the noise threshold is determined to have been reached, noise can be determined as being detected, that may have been caused by environmental conditions. If the noise threshold has not been reached, an object can be determined to have been detected without any or limited noise interference, representative of a less likelihood for environmental interference from current environmental conditions.

Accordingly, in some examples, the method includes generating a second image using the pixels from the first image that represent the higher degree of image detail at block 240. For example, the data management platform 152 illustrated in FIG. 1 may generate a second image using the pixels from the first image that represents the higher degree of image detail. Generating a second image using the pixels from the first image that represent the higher degree of image detail produces a compressed image of the second image depicting the severity of the environmental conditions. The second image can be a two-dimensional (2D) representation of an environment around the AV. The second image can be a three-dimensional (3D) representation of an environment around the AV. Generating the second image comprises applying an autoregressive (AR) estimation model.

In some examples, with reference to block 240, the first set of coefficients at the first-level analysis are stored, to be utilized for reference at the second-level analysis. Upon the performance of the second-level analysis and the generated second set of coefficients, the first set and the second set of coefficients can be reconstructed together to generate a second image. The benefit of the first-level and second-level analysis provides a high-resolution second image. In some examples, a multi-level analysis can be implemented in order to further generate an even higher resolution image than the previous level. These multi-level analysis implementations can be utilized for specific image focuses including select pixels, sections of pixels, the entire image, or multiple images within the image stream.

According to some examples, the method includes outputting the second image made up of the pixels that represent the higher degree of image detail for use by a perception stack at block 250. For example, one of the sensor systems 104-106 illustrated in FIG. 1 may output the second image made up of the pixels that represent the higher degree of image detail to a perception stack 112.

As is typical of some machine learning algorithms, data can be input into an initial layer and be processed by additional layers to down sample the input data to reduce the dimensionality of the data down to a set of features that are able to be analyzed by nodes of the neural network in a suitable amount of time given the use environment and processing abilities of the relevant computing system.

In the instance of the present technology, the second image output by block 250 has already undergone a reduction in resolution or dimensionality by virtue of generating the second image from pixels that are less influenced by noise in the original image. Accordingly, the present technology can inject the second images that have been processed as addressed with respect to the method described in FIG. 2 at a subsequent layer of the machine learning algorithm and skipping the down sampling that would typically occur at the prior layers.

According to some examples, the method includes receiving an identification of the at least one object in the environment from the perception stack at block 260. For example, the planning stack 116 illustrated in FIG. 1 may receive an identification of the at least one object in the environment from the perception stack.

In some embodiments, the sensor system 104-106 illustrated in FIG. 1 may measure changes in the amount of reflected light received by the optical device or an image captured, of the environment around the AV due to the change in weather conditions. The sensor system may be able to discern a variation in image data from the optical device to characterize or interpret the captured information.

In some examples, the optical device can determine the degree of the adverse conditions can determine weather conditions such as rain, wind, snow, sleep, hail, or the severity of the aforementioned conditions. The degree can be measured based on the consistency of the weather, the quality of the image captured, the level of visibility of an object in the image captured, or noticeable weather types that are able to be determined from the image capture itself. An image in the image stream captured from the optical device can be processed based on the variance of characterization information into an environmental model to determine the weather condition and the associated intensity, as well as any sensor degradation in real-time.

According to some examples, the method includes comparing the first set of coefficients and the second set of coefficients with a environmental model made up of a set of coefficients at block 230. For example, the data management platform 152 illustrated in FIG. 1 may compare the first set of coefficients and the second set of coefficients using a model set of coefficients. The comparison of the first set of coefficients and the second set of coefficients is indicative of a change in the environmental conditions. The model can correlate the set of coefficients to one or more environmental conditions and/or the severity of the environmental conditions.

In some embodiments, the environmental model can be a trained machine model developed from the analysis of the pixels that are combined to form a complete image captured by the optical device. Each of the pixels in the image is combined in order to create a resolution of the image that is either captured with clarity or with some disturbance of interference that is considered noise in this case. The noise within the image, represented by pixels in the image, captured of the AVs surroundings can be considered representative of weather, atmospheric conditions, or environmental conditions, and severity thereof that the AV is currently experiencing.

While the FIG. 2 was mostly addressed in the context of a visual sensor, it will be appreciated by those of ordinary skill in the art, that the technology could also be applied to sensors of other types.

Figure 3:
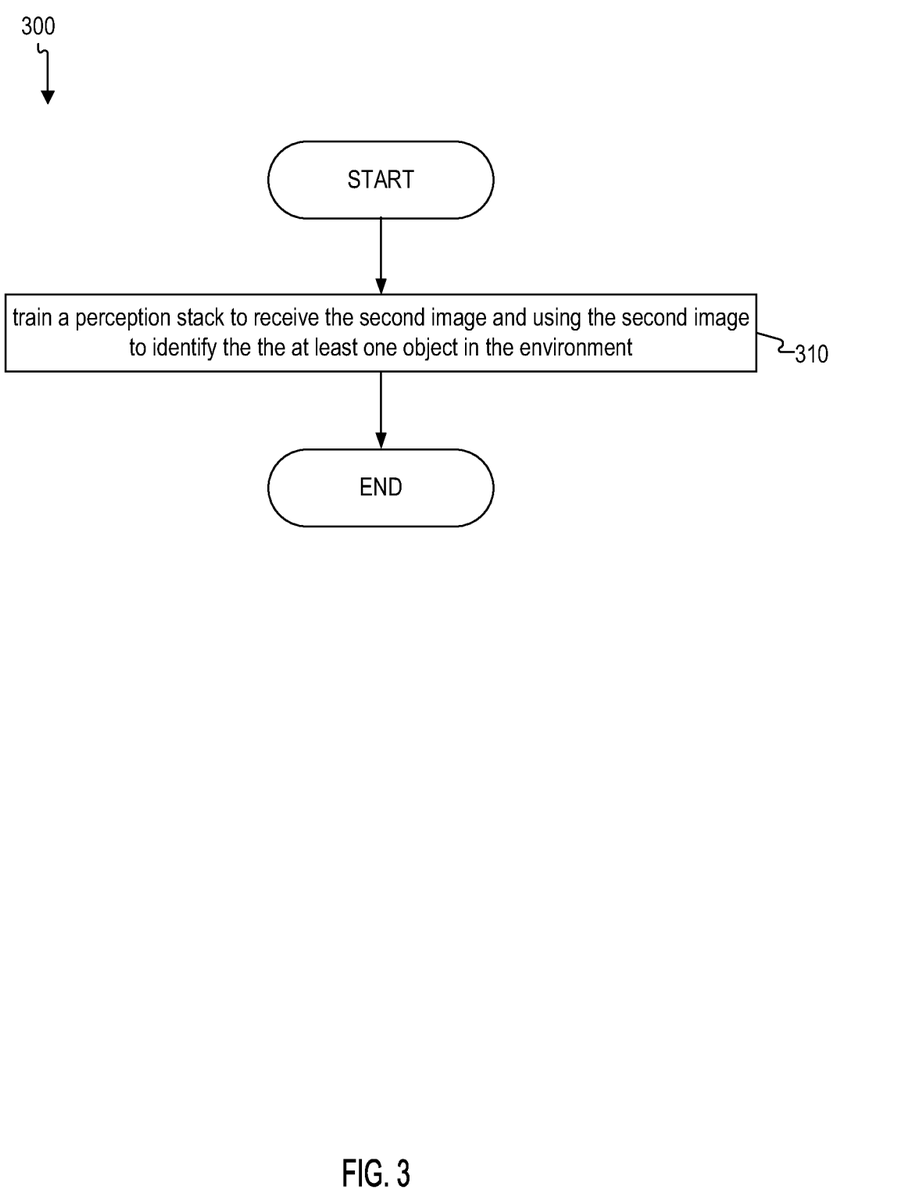
FIG. 3 illustrates an example method for training a perception stack to receive the second image, according to some aspects of the disclosed technology.

FIG. 3 illustrates an example method 300 for training a perception stack to receive the second image that is the output from the sensor system described with respect to block 250 in FIG. 2. Although the example method 300 depicts a particular sequence of operations, the sequence may be altered without departing from the scope of the present disclosure. For example, some of the operations depicted may be performed in parallel or in a different sequence that does not materially affect the function of the method 300. In other examples, different components of an example device or system that implements the method 300 may perform functions at substantially the same time or in a specific sequence.

According to some examples, the method includes training a perception stack to receive the second image and using the second image to identify the at least one object in the environment at block 310. For example, the AUML platform 154 illustrated in FIG. 1 may train a perception stack to receive the second image and using the second image to identify the at least one object in the environment.

The perception stack is a neural network. Accordingly, the perception stack may receive a series of images from the image stream in order to be processed to determine a plurality of correlations in the data obtained from the images stored. The perception stack is able to receive a plurality of data from multiple sensors, and cameras that are configured to perceive the environment surrounding the AV.

As is typical of some machine learning algorithms, data can be input into an initial layer and be processed by additional layers to down sample the input data to reduce the dimensionality of the data down to a set of features that are able to be analyzed by nodes of the neural network in a suitable amount of time given the use environment and processing abilities of the relevant computing system.

In the instance of the present technology, the second image output by block 250 has already undergone a reduction in resolution or dimensionality by virtue of generating the second image from pixels that are less influenced by noise in the original image. Accordingly, the present technology can inject the second images that have been processed as addressed with respect to the method described in FIG. 2 at a subsequent layer of the machine learning algorithm and skipping the down sampling that would typically occur at the prior layers.

Accordingly, block 310 of FIG. 3 refers to training the perception stack to receive the second images injected at the subsequent layer of the model making up the perception stack when the sensor system provides image data that has been processed as described with respect to FIG. 2. The perception stack may still receive full resolution images from the sensor system that have not been processed according to the method described with respect to FIG. 2, such as when there is very little environmental interference and the output of the sensor system is not significantly impacted by environmental noise.

Figure 4:
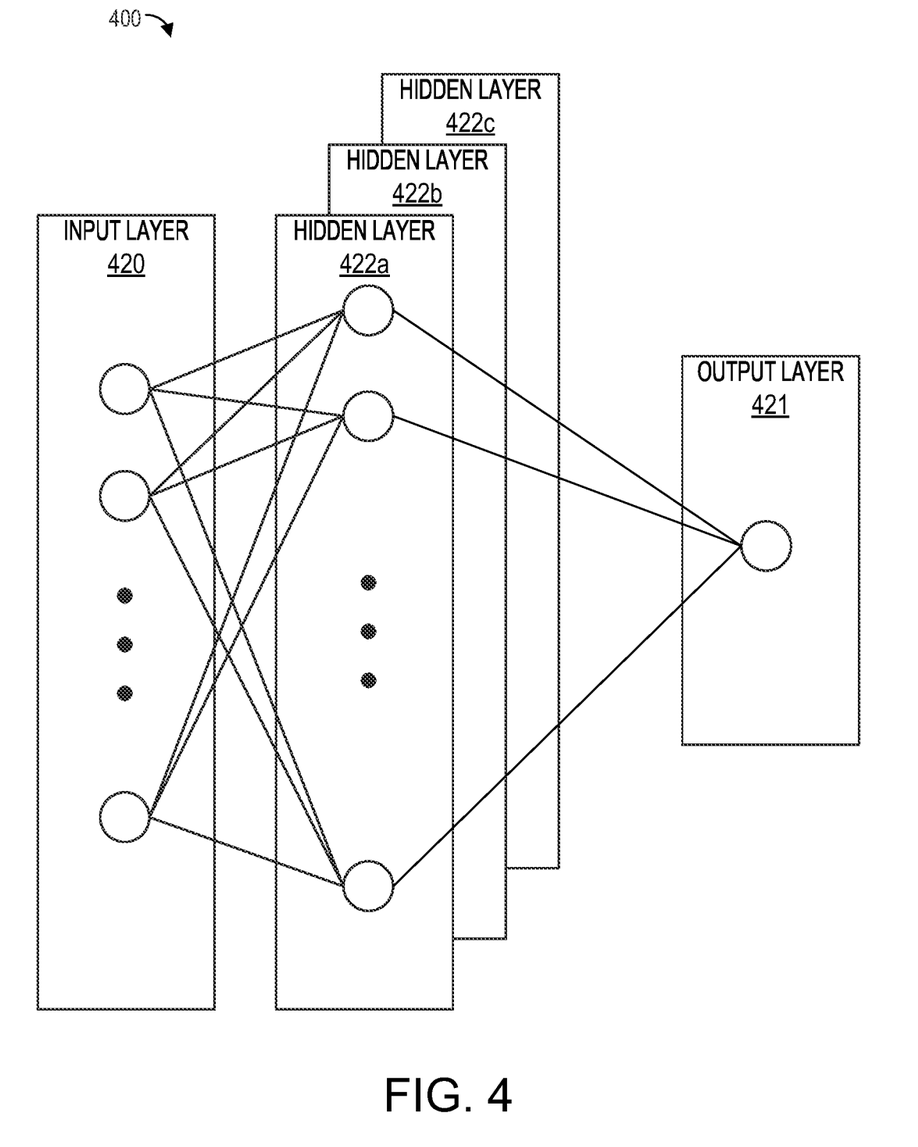
FIG. 4 illustrates an example of a deep learning neural network that can be used to implement a perception module and/or one or more validation modules, according to some aspects of the disclosed technology.

In FIG. 4, the disclosure now turns to a further discussion of models that can be used through the environments and techniques described herein. Specifically, FIG. 4 is an illustrative example of a deep learning neural network 400 that can be used to implement all or a portion of a perception module (or perception system) as discussed above. An input layer 420 can be configured to receive sensor data and/or data relating to an environment surrounding an AV. The neural network 400 includes multiple hidden layers 422a, 422b, through 422n. The hidden layers 422a, 422b, through 422n include "n" number of hidden layers, where "n" is an integer greater than or equal to one. The number of hidden layers can be made to include as many layers as needed for the given application. The neural network 400 further includes an output layer 421 that provides an output resulting from the processing performed by the hidden layers 422a, 422b, through 422n. In one illustrative example, the output layer 421 can provide estimated treatment parameters, that can be used/ingested by a differential simulator to estimate a patient treatment outcome.

The neural network 400 is a multi-layer neural network of interconnected nodes. Each node can represent a piece of information. Information associated with the nodes is shared among the different layers and each layer retains information as information is processed. In some cases, the neural network 400 can include a feed-forward network, in which case there are no feedback connections where outputs of the network are fed back into itself. In some cases, the neural network 400 can include a recurrent neural network, which can have loops that allow information to be carried across nodes while reading in input.

Information can be exchanged between nodes through node-to-node interconnections between the various layers. Nodes of the input layer 420 can activate a set of nodes in the first hidden layer 422a. For example, as shown, each of the input nodes of the input layer 420 is connected to each of the nodes of the first hidden layer 422a. The nodes of the first hidden layer 422a can transform the information of each input node by applying activation functions to the input node information. The information derived from the transformation can then be passed to and can activate the nodes of the next hidden layer 422b, which can perform their own designated functions. Example functions include convolutional, up-sampling, data transformation, and/or any other suitable functions. The output of the hidden layer 422b can then activate nodes of the next hidden layer, and so on. The output of the last hidden layer 422n can activate one or more nodes of the output layer 421, at which an output is provided. In some cases, while nodes in the neural network 400 are shown as having multiple output lines, a node can have a single output and all lines shown as being output from a node represent the same output value.

In some cases, each node or interconnection between nodes can have a weight that is a set of parameters derived from the training of the neural network 400. Once the neural network 400 is trained, it can be referred to as a trained neural network, which can be used to classify one or more activities. For example, an interconnection between nodes can represent a piece of information learned about the interconnected nodes. The interconnection can have a tunable numeric weight that can be tuned (e.g., based on a training dataset), allowing the neural network 400 to be adaptive to inputs and able to learn as more and more data is processed.

The neural network 400 is pre-trained to process the features from the data in the input layer 420 using the different hidden layers 422a, 422b, through 422n in order to provide the output through the output layer 421.

In some cases, the neural network 400 can adjust the weights of the nodes using a training process called backpropagation. A backpropagation process can include a forward pass, a loss function, a backward pass, and a weight update. The forward pass, loss function, backward pass, and parameter/weight update is performed for one training iteration. The process can be repeated for a certain number of iterations for each set of training data until the neural network 400 is trained well enough so that the weights of the layers are accurately tuned.

To perform training, a loss function can be used to analyze error in the output. Any suitable loss function definition can be used, such as a Cross-Entropy loss. Another example of a loss function includes the mean squared error (MSE), defined as $E\_total = \Sigma(\frac{1}{2}(target - output)^2)$. The loss can be set to be equal to the value of E_total.

The loss (or error) will be high for the initial training data since the actual values will be much different than the predicted output. The goal of training is to minimize the amount of loss so that the predicted output is the same as the training output. The neural network 400 can perform a backward pass by determining which inputs (weights) most contributed to the loss of the network, and can adjust the weights so that the loss decreases and is eventually minimized.

The neural network 400 can include any suitable deep network. One example includes a Convolutional Neural Network (CNN), which includes an input layer and an output layer, with multiple hidden layers between the input and out layers. The hidden layers of a CNN include a series of convolutional, nonlinear, pooling (for downsampling), and fully connected layers. The neural network 400 can include any other deep network other than a CNN, such as an autoencoder, Deep Belief Nets (DBNs), Recurrent Neural Networks (RNNs), among others.

As understood by those of skill in the art, machine-learning based classification techniques can vary depending on the desired implementation. For example, machine-learning classification schemes can utilize one or more of the following, alone or in combination: hidden Markov models; RNNs; CNNs; deep learning; Bayesian symbolic methods; Generative Adversarial Networks (GANs); support vector machines; image registration methods; and applicable rule-based systems. Where regression algorithms are used, they may include but are not limited to: a Stochastic Gradient Descent Regressor, a Passive Aggressive Regressor, etc.

Machine learning classification models can also be based on clustering algorithms (e.g., a Mini-batch K-means clustering algorithm), a recommendation algorithm (e.g., a Min-wise Hashing algorithm, or Euclidean Locality-Sensitive Hashing (LSH) algorithm), and/or an anomaly detection algorithm, such as a local outlier factor. Additionally, machine-learning models can employ a dimensionality reduction approach, such as, one or more of: a Mini-batch Dictionary Learning algorithm, an incremental Principal Component Analysis (PCA) algorithm, a Latent Dirichlet Allocation algorithm, and/or a Mini-batch K-means algorithm, etc.

While various flow diagrams provided and described above, such as those in FIGS. 2 and 3 may may show a particular order of operations performed by some embodiments of the subject technology, it should be understood that such order is exemplary. Alternative embodiments may perform the operations in a different order, combine certain operations, overlap certain operations, or some combination thereof. It should be understood that unless disclosed otherwise, any process illustrated in any flow diagram herein or otherwise illustrated or described herein may be performed by a machine, mechanism, and/or processor based system 5 discussed herein, and may be performed automatically (e.g., in response to one or more triggers/conditions described herein), autonomously, semi-autonomously (e.g., based on received instructions), or a combination thereof. Furthermore, any action described herein as occurring in response to one or more particular triggers/conditions should be understood to optionally occur automatically response to the one or more particular triggers/conditions.

As described herein, one aspect of the present technology is the gathering and use of data available from various sources to improve quality and experience. The present disclosure contemplates that in some instances, this gathered data may include personal information. The present disclosure contemplates that the entities involved with such personal information respect and value privacy policies and practices, for example by encrypting such information.

Figure 5:
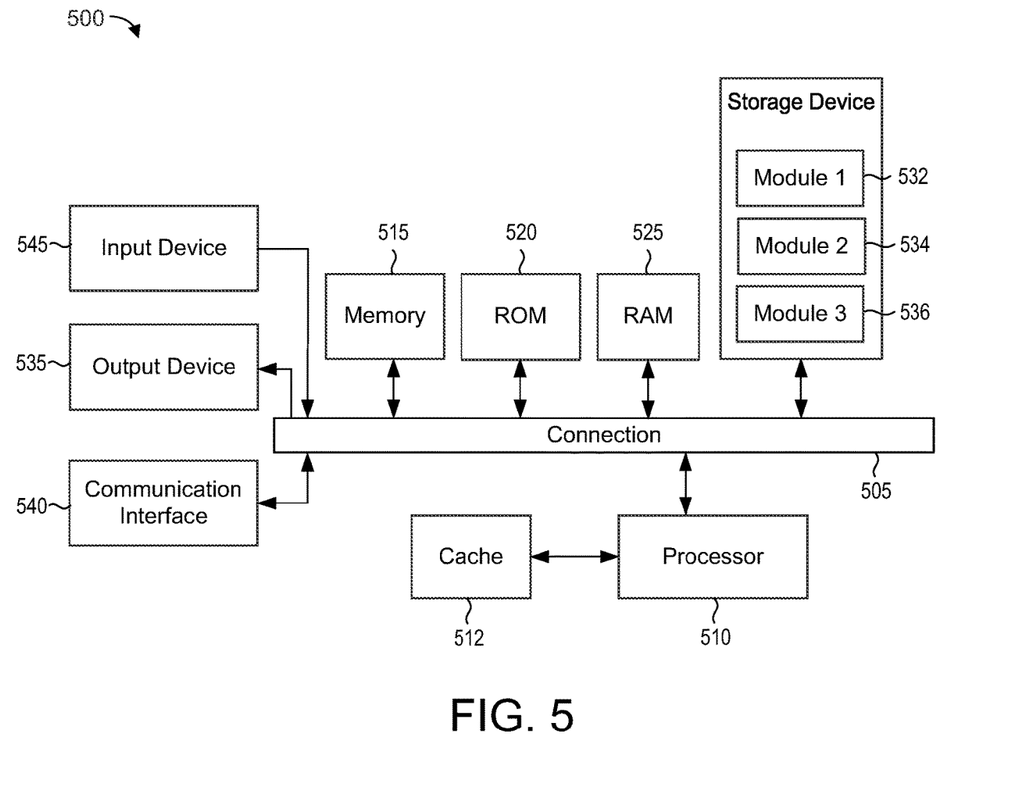
FIG. 5 illustrates an example processor-based system with which some aspects of the subject technology can be implemented.

FIG. 5 illustrates an example processor-based system with which some aspects of the subject technology can be implemented. For example, processor-based system 500 can be any computing device making up, or any component thereof in which the components of the system are in communication with each other using connection 505. Connection 505 can be a physical connection via a bus, or a direct connection into processor 510, such as in a chipset architecture. Connection 505 can also be a virtual connection, networked connection, or logical connection.

In some embodiments, computing system 500 is a distributed system in which the functions described in this disclosure can be distributed within a datacenter, multiple data centers, a peer network, etc. In some embodiments, one or more of the described system components represents many such components each performing some or all of the function for which the component is described. In some embodiments, the components can be physical or virtual devices.

Example system 500 includes at least one processing unit (Central Processing Unit (CPU) or processor) 510 and connection 505 that couples various system components including system memory 515, such as Read-Only Memory (ROM) 520 and Random-Access Memory (RAM) 525 to processor 510. Computing system 500 can include a cache of high-speed memory 512 connected directly with, in close proximity to, or integrated as part of processor 510.

Processor 510 can include any general-purpose processor and a hardware service or software service, such as services 532, 534, and 536 stored in storage device 530, configured to control processor 510 as well as a special-purpose processor where software instructions are incorporated into the actual processor design. Processor 510 may essentially be a completely self-contained computing system, containing multiple cores or processors, a bus, memory controller, cache, etc. A multi-core processor may be symmetric or asymmetric.

To enable user interaction, computing system 500 includes an input device 545, which can represent any number of input mechanisms, such as a microphone for speech, a touch-sensitive screen for gesture or graphical input, keyboard, mouse, motion input, speech, etc. Computing system 500 can also include output device 535, which can be one or more of a number of output mechanisms known to those of skill in the art. In some instances, multimodal systems can enable a user to provide multiple types of input/output to communicate with computing system 500. Computing system 500 can include communications interface 540, which can generally govern and manage the user input and system output. The communication interface may perform or facilitate receipt and/or transmission wired or wireless communications via wired and/or wireless transceivers, including those making use of an audio jack/plug, a microphone jack/plug, a Universal Serial Bus (USB) port/plug, an Apple® Lightning® port/plug, an Ethernet port/plug, a fiber optic port/plug, a proprietary wired port/plug, a BLUETOOTH® wireless signal transfer, a BLUETOOTH® low energy (BLE) wireless signal transfer, an IBEACON® wireless signal transfer, a Radio-Frequency Identification (RFID) wireless signal transfer, Near-Field Communications (NFC) wireless signal transfer, Dedicated Short Range Communication (DSRC) wireless signal transfer, 802.11 Wi-Fi® wireless signal transfer, Wireless Local Area Network (WLAN) signal transfer, Visible Light Communication (VLC) signal transfer, Worldwide Interoperability for Microwave Access (WiMAX), Infrared (IR) communication wireless signal transfer, Public Switched Telephone Network (PSTN) signal transfer, Integrated Services Digital Network (ISDN) signal transfer, 3G/4G/5G/LTE cellular data network wireless signal transfer, ad-hoc network signal transfer, radio wave signal transfer, microwave signal transfer, infrared signal transfer, visible light signal transfer signal transfer, ultraviolet light signal transfer, wireless signal transfer along the electromagnetic spectrum, or some combination thereof.

Communication interface 540 may also include one or more Global Navigation Satellite System (GNSS) receivers or transceivers that are used to determine a location of the computing system 500 based on receipt of one or more signals from one or more satellites associated with one or more GNSS systems. GNSS systems include, but are not limited to, the US-based Global Positioning System (GPS), the Russia-based Global Navigation Satellite System (GLONASS), the China-based BeiDou Navigation Satellite System (BDS), and the Europe-based Galileo GNSS. There is no restriction on operating on any particular hardware arrangement, and therefore the basic features here may easily be substituted for improved hardware or firmware arrangements as they are developed.

Storage device 530 can be a non-volatile and/or non-transitory and/or computer-readable memory device and can be a hard disk or other types of computer readable media which can store data that are accessible by a computer, such as magnetic cassettes, flash memory cards, solid state memory devices, digital versatile disks, cartridges, a floppy disk, a flexible disk, a hard disk, magnetic tape, a magnetic strip/stripe, any other magnetic storage medium, flash memory, memristor memory, any other solid-state memory, a Compact Disc (CD) Read Only Memory (CD-ROM) optical disc, a rewritable CD optical disc, a Digital Video Disk (DVD) optical disc, a Blu-ray Disc (BD) optical disc, a holographic optical disk, another optical medium, a Secure Digital (SD) card, a micro SD (microSD) card, a Memory Stick® card, a smartcard chip, a EMV chip, a Subscriber Identity Module (SIM) card, a mini/micro/nano/pico SIM card, another Integrated Circuit (IC) chip/card, Random-Access Memory (RAM), Atatic RAM (SRAM), Dynamic RAM (DRAM), Read-Only Memory (ROM), Programmable ROM (PROM), Erasable PROM (EPROM), Electrically Erasable PROM (EEPROM), flash EPROM (FLASHEPROM), cache memory (L1/L2/L3/L4/L5/L #), Resistive RAM (RRAM/ReRAM), Phase Change Memory (PCM), Spin Transfer Torque RAM (STT-RAM), another memory chip or cartridge, and/or a combination thereof.

Storage device 530 can include software services, servers, services, etc., and when the code that defines such software is executed by the processor 510, it causes the system 500 to perform a function. In some embodiments, a hardware service that performs a particular function can include the software component stored in a computer-readable medium in connection with the necessary hardware components, such as processor 510, connection 505, output device 535, etc., to carry out the function.

Embodiments within the scope of the present disclosure may also include tangible and/or non-transitory computer-readable storage media or devices for carrying or having computer-executable instructions or data structures stored thereon. Such tangible computer-readable storage devices can be any available device that can be accessed by a general purpose or special purpose computer, including the functional design of any special purpose processor as described above. By way of example, and not limitation, such tangible computer-readable devices can include RAM, ROM, EEPROM, CD-ROM or other optical disk storage, magnetic disk storage or other magnetic storage devices, or any other device which can be used to carry or store desired program code in the form of computer-executable instructions, data structures, or processor chip design. When information or instructions are provided via a network or another communications connection (either hardwired, wireless, or combination thereof) to a computer, the computer properly views the connection as a computer-readable medium. Thus, any such connection is properly termed a computer-readable medium. Combinations of the above should also be included within the scope of the computer-readable storage devices.

Computer-executable instructions include, for example, instructions and data which cause a general-purpose computer, special purpose computer, or special purpose processing device to perform a certain function or group of functions. Computer-executable instructions also include program modules that are executed by computers in stand-alone or network environments. Generally, program modules include routines, programs, components, data structures, objects, and the functions inherent in the design of special-purpose processors, etc. that perform tasks or implement abstract data types. Computer-executable instructions, associated data structures, and program modules represent examples of the program code means for executing steps of the methods disclosed herein. The particular sequence of such executable instructions or associated data structures represents examples of corresponding acts for implementing the functions described in such steps.

Other embodiments of the disclosure may be practiced in network computing environments with many types of computer system configurations, including personal computers, hand-held devices, multi-processor systems, microprocessor-based or programmable consumer electronics, network Personal Computers (PCs), minicomputers, mainframe computers, and the like. Embodiments may also be practiced in distributed computing environments where tasks are performed by local and remote processing devices that are linked (either by hardwired links, wireless links, or by a combination thereof) through a communications network. In a distributed computing environment, program modules may be located in both local and remote memory storage devices.

Selected Examples

Example 1 includes a system of an autonomous vehicle that includes memory and processors configured to execute instructions. The system can receive a first image from at least one optical device of an autonomous vehicle (AV), wherein the image comprises a representation an environment around the AV including at least one object, wherein visibility of the at least one object is impaired by environmental conditions. The system can determine pixels in the first image representing noise from the environmental conditions in comparison to other pixels in the first image that represents a higher degree of image detail. The system can generate a second image using the pixels from the first image that represent the higher degree of image detail Example 2 includes a computer implemented method that includes receiving a first image from at least one optical device of an autonomous vehicle (AV), wherein the image comprises a representation of an environment around the AV including at least one object, wherein visibility of the at least one object is impaired by environmental conditions. The method further includes determining pixels in the first image representing noise from the environmental conditions in comparison to other pixels in the first image that represents a higher degree of image detail. The method further includes generating a second image using the pixels from the first image that represent the higher degree of image detail.

Example 3 includes a non-transitory computer readable storage medium having embodied thereon a program, wherein the program is executable by a processor to perform a method of simulation. The method of simulation includes receiving a first image from at least one optical device of an autonomous vehicle (AV), wherein the image comprises a representation an environment around the AV including at least one object, wherein visibility of the at least one object is impaired by environmental conditions. The method of simulation includes determining pixels in the first image representing noise from the environmental conditions in comparison to other pixels in the first image that represents a higher degree of image detail. The method of simulation includes generating a second image using the pixels from the first image that represent the higher degree of image detail.

The various embodiments described above are provided by way of illustration only and should not be construed to limit the scope of the disclosure. For example, the principles herein apply equally to optimization as well as general improvements. Various modifications and changes may be made to the principles described herein without following the example embodiments and applications illustrated and described herein, and without departing from the spirit and scope of the disclosure. Claim language reciting "at least one of" a set indicates that one member of the set or multiple members of the set satisfy the claim.

Aspect 1. A computer-implemented method, comprising: receiving an first image from at least one optical device of an autonomous vehicle (AV), wherein the image comprises a representation an environment around the AV including at least one object, wherein visibility of the at least one object is impaired by an environmental conditions; determining pixels in the first image representing noise from the environmental conditions in comparison to other pixels in the first image that represent a higher degree of image detail; generating a second image using the pixels from the first image that represent the higher degree of image detail.

Aspect 2. The computer-implemented method of Aspect 1, wherein determining pixels in the first image representing noise from the environmental conditions in comparison to other pixels in the first image that represent a higher degree of image detail further comprises: performing a static wavelet transform (SWT) decomposition, wherein the SWT decomposition is applied across a row and a column of the image.

Aspect 3. The computer-implemented method of any of Aspects 1 to 2, wherein the SWT decomposition comprises generating an output correlation between a wavelet and one or more pixels of the image.

Aspect 4. The computer-implemented method of any of Aspects 1 to 3, wherein the SWT decomposition generates a first set of coefficients for pixels in the image to determine a shape of an the at least one object in the image and a second set of coefficients to determine noise in the image; determining based on a comparison of the first set of coefficients and the second set of coefficients if pixels in the image represent noise of the image in comparison to other pixels in the image.

Aspect 5. The computer-implemented method of any of Aspects 1 to 4, wherein the comparison of the first set of coefficients and the second set of coefficients is indicative of a change in the environmental conditions.

Aspect 6. The computer-implemented method of any of Aspects 1 to 5, wherein the comparison of the first set of coefficients and the second set of coefficients is generated in a first level analysis and a second level analysis.

Aspect 7. The computer-implemented method of any of Aspects 1 to 6, further comprising comparing the first set of coefficients and the second set of coefficients with a model set of coefficients.

Aspect 8. The computer-implemented method of any of Aspects 1 to 7, wherein the model set of coefficients represents one or more environmental conditions, wherein a model set of coefficients is correlated to a weather type and severity.

Aspect 9. The computer-implemented method of any of Aspects 1 to 8, wherein the generating the second image comprises applying an autoregressive (AR) estimation model. wherein the generating the second image comprises applying an autoregressive (AR) estimation model.

Aspect 10. The computer-implemented method of any of Aspects 1 to 9, wherein noise in an image is indicative of a severity of weather or a type of weather the AV is experiencing.

Aspect 11. The computer-implemented method of any of Aspects 1 to 10, wherein the generating a second image using the pixels from the first image that represent the higher degree of image detail produces a compressed image of the second image depicting a severity of the environmental conditions.

Aspect 12. The computer-implemented method of any of Aspects 1 to 11, further comprising training a perception stack to receive the second image and using the second image to identify the at least one object in the environment, wherein the perception stack is a neural network.

Aspect 13. The computer-implemented method of any of Aspects 1 to 12, wherein the second image is a two-dimensional (2D) representation of an environment around the AV.

Aspect 14. The computer-implemented method of any of Aspects 1 to 13, wherein the second image is a three-dimensional (3D) representation of an environment around the AV.

Aspect 15. The computer-implemented method of any of Aspects 1 to 14, further comprising: outputting the second image made up of the pixels that represent the higher degree of image detail to a perception stack; receiving an identification of the at least one object in the environment from the perception stack.

What is claimed is:

1. A computer-implemented method, comprising:
   receiving a first image from at least one optical device of an autonomous vehicle (AV), wherein the first image comprises a representation of an environment around the AV including at least one object, wherein visibility of the at least one object is impaired by environmental conditions;
   determining a first set of pixels in the first image, wherein the first set of pixels represents noise from the environmental conditions, determining a second set of pixels in the first image, wherein the second set of pixels have a higher degree of image detail than the first set of pixels, wherein the determining the first set of pixels and the second set of pixels is done by performing a static wavelet transform (SWT) decomposition, wherein the SWT decomposition is applied across a row and a column of the first image, wherein the SWT decomposition:
   generates a first set of coefficients for pixels in the first image to determine a shape of the at least one object in the first image and a second set of coefficients to determine noise in the first image; and
   determines for each pixel in the first image, based on a comparison of the first set of coefficients and the second set of coefficients, whether the pixel in the first image is a pixel in the first set of pixels or a pixel in the second set of pixels, wherein each pixel in the first set of pixels represents noise of the first image in comparison to pixels in the second set of pixels and each pixel in the second set of pixels is determined to be a pixel without noise responsive to the first set of coefficients matching coefficients of an object by more than a noise threshold; and
   generating a second image using the second set of pixels from the first image.

2. The computer-implemented method of claim 1, wherein the SWT decomposition comprises generating an output correlation between a wavelet and one or more pixels of the image.

3. The computer-implemented method of claim 1, wherein the comparison of the first set of coefficients and the second set of coefficients is indicative of a change in the environmental conditions.

4. The computer-implemented method of claim 1, wherein the comparison of the first set of coefficients and the second set of coefficients is generated in a first level analysis and a second level analysis.

5. The computer-implemented method of claim 1, further comprising comparing the first set of coefficients and the second set of coefficients with a model set of coefficients.

6. The computer-implemented method of claim 5, wherein the model set of coefficients represents one or more environmental conditions, and wherein the model set of coefficients is correlated to a weather type and severity.

7. The computer-implemented method of claim 1, wherein generating the second image comprises applying an autoregressive (AR) estimation model.

8. The computer-implemented method of claim 1, wherein noise in an image is indicative of a severity of weather or a type of weather the AV is experiencing.

9. The computer-implemented method of claim 1, wherein generating a second image using the pixels from the first image that represent the higher degree of image detail produces a compressed image of the second image depicting a severity of the environmental conditions.

10. The computer-implemented method of claim 1, further comprising training a perception stack to receive the second image and using the second image to identify the at least one object in the environment, wherein the perception stack is a neural network.

11. The computer-implemented method of claim 1, wherein the second image is a two-dimensional (2D) representation of an environment around the AV.

12. The computer-implemented method of claim 1, wherein the second image is a three-dimensional (3D) representation of an environment around the AV.

13. The computer-implemented method of claim 1, further comprising:
outputting the second image made up from the pixels that represent the higher degree of image detail to a perception stack; and
receiving an identification of the at least one object in the environment from the perception stack.

14. A system of an autonomous vehicle (AV), the system comprising:
one or more memory units storing instructions; and
one or more processors that execute the instructions, wherein execution of the instructions by the one or more processors causes the one or more processors to:
receive a first image from at least one optical device of an autonomous vehicle (AV), wherein the first image comprises a representation an environment around the AV including at least one object, wherein visibility of the at least one object is impaired by environmental conditions;
determine a first set of pixels in the first image, wherein the first set of pixels represents noise from the environmental conditions, determine a second set of pixels in the first image, wherein the second set of pixels has a higher degree of image detail than the first set of pixels, wherein the determining the first set of pixels and the second set of pixels is done by performing a static wavelet transform (SWT) decomposition, wherein the SWT decomposition is applied across a row and a column of the first image, wherein the SWT decomposition: generates a first set of coefficients for pixels in the first image to determine a shape of the at least one object in the first image and a second set of coefficients to determine noise in the first image; and determines for each pixel in the first image, based on a comparison of the first set of coefficients and the second set of coefficients, whether the pixel in the first image is a pixel in the first set of pixels or a pixel in the second set of pixels, wherein each pixel in the first set of pixels represents noise of the first image in comparison to pixels in the second set of pixels and each pixel in the second set of pixels is determined to be a pixel without noise responsive to the first set of coefficients matching coefficients of an object by more than a noise threshold; and
generate a second image using the second set of pixels from the first image.

15. The system of claim 14, wherein determining pixels in the first image representing noise from the environmental conditions in comparison to other pixels in the first image that represents a higher degree of image detail further comprises performing a static wavelet transform (SWT) decomposition, wherein the SWT decomposition is applied across a row and a column of the image.

16. The system of claim 15, wherein the SWT decomposition comprises generating an output correlation between a wavelet and one or more pixels of the image.

17. A non-transitory computer-readable storage medium having embodied thereon a program, wherein the program is executable by a processor to perform a method of simulation, the method comprising:
receiving a first image from at least one optical device of an autonomous vehicle (AV), wherein the first image comprises a representation an environment around the AV including at least one object, wherein visibility of the at least one object is impaired by environmental conditions;
determining a first set of pixels in the first image, wherein the first set of pixels represents noise from the environmental conditions, determine a second set of pixels in the first image, wherein the second set of pixels has a higher degree of image detail than the first set of pixels, wherein the determining the first set of pixels and the second set of pixels is done by performing a static wavelet transform (SWT) decomposition, wherein the SWT decomposition is applied across a row and a column of the image, wherein the SWT decomposition: generates a first set of coefficients for pixels in the image to determine a shape of the at least one object in the image and a second set of coefficients to determine noise in the image; and determines for each pixel in the first image, based on a comparison of the first set of coefficients and the second set of coefficients, whether the pixel in the first image is a pixel in the first set of pixels or a pixel in the second set of pixels, wherein each pixel in the first set of pixels represents noise of the first image in comparison to pixels in the second set of pixels and each pixel in the second set of pixels is determined to be a pixel without noise responsive to the first set of coefficients matching coefficients of an object by more than a noise threshold; and
generating a second image using the pixels from the first image that represent the higher degree of image detail.

* * * * *